United States Patent [19]

Takahashi et al.

[11] 4,337,572
[45] Jul. 6, 1982

[54] DEVICE FOR MANUFACTURE OF ASSEMBLED CAM SHAFT

[75] Inventors: Akio Takahashi, Toyota; Chiaki Tsumuki, Aichi; Hitoshi Nakamura; Juro Ozaki, both of Toyota, all of Japan

[73] Assignee: Toyota Jidosha Kogyo Kabushiki Kaisha, Toyota, Japan

[21] Appl. No.: 236,212

[22] Filed: Feb. 19, 1981

Related U.S. Application Data

[62] Division of Ser. No. 939,857, Sep. 5, 1978, Pat. No. 4,265,388.

[30] Foreign Application Priority Data

Sep. 8, 1977 [JP] Japan .................................. 52-108174

[51] Int. Cl.³ .......................... B23P 19/02; B23P 19/04
[52] U.S. Cl. .......................................... 29/792; 29/6; 29/241
[58] Field of Search ............... 29/6, 33 K, 35.5, 38 R, 29/241, 433, 467, 468, 785, 791, 792, 795, 525

[56] References Cited

U.S. PATENT DOCUMENTS

| | | | |
|---|---|---|---|
| 1,300,531 | 4/1919 | Weis | 29/6 X |
| 1,518,610 | 12/1924 | Steenstrup | 29/6 |
| 2,087,481 | 7/1937 | Roby et al. | 29/241 X |
| 2,515,487 | 7/1950 | Bertalan | 29/33 K |
| 3,008,220 | 11/1961 | Sammarco | 29/433 X |
| 3,088,198 | 5/1963 | Svenson | 29/785 X |
| 3,872,578 | 3/1975 | Ullom | 29/525 |

Primary Examiner—Ervin M. Combs
Attorney, Agent, or Firm—Brisebois & Kruger

[57] ABSTRACT

Process and device for manufacturing cam shaft characterized in that axial grooves are cut on a cam shaft, while projections with a profile matching said axial grooves and slightly larger than said axial grooves are provided on the fitting surface of pieces to be assembled to said cam shaft, whereby said projections of said pieces are fitted into said grooves of said cam shaft.

4 Claims, 11 Drawing Figures

FIG.1
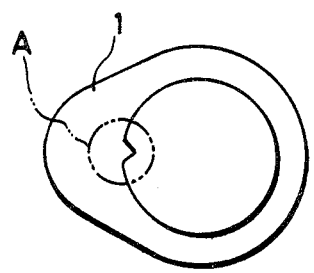
FIG.2(a)       FIG.2(b)
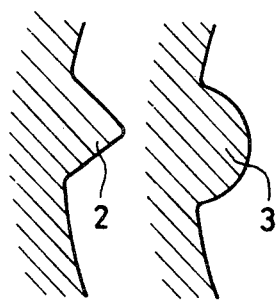    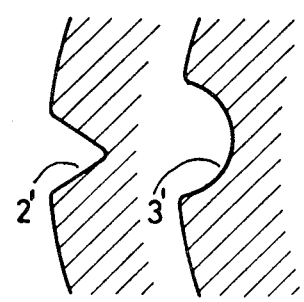
FIG.3
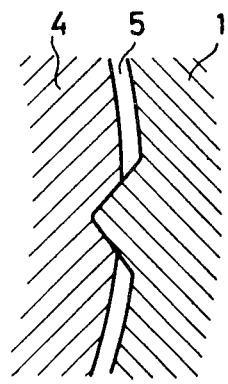

DEVICE FOR MANUFACTURE OF ASSEMBLED CAM SHAFT

This is a division, of application Ser. No. 939,857, filed Sept. 5, 1978, which application is now U.S. Pat. No. 4,265,388.

BACKGROUND OF THE INVENTION

The present invention relates to a process and device for manufacturing an assembled cam shaft.

The auto engine is equipped with a suction valve to take the mixed gas into the cylinder and an exhaust valve to discharge the combustion gas out of the engine; and it is well-known that cam shafts are utilized to open and close these valves with appropriate timing. Conventional cam shafts have been castings but weight reduction of vehicle, improvement of production step of parts and cutdown of production cost are increasingly demanded in recent years. It is found, however, difficult to cast a hollow cam shaft with thin wall, to reduce the processing cost of each cam or journal, or to manufacture products of uniform quality. Moreover, virtually the limit has been reached in the qualitative improvement of materials for cam.

For these reasons, various processes for manufacturing assembled cam shafts by preparing a solid or hollow steel shaft and then assembling it with separately produced constituent parts such as cam, journal to make a cam shaft have been proposed in recent years. For the purpose of assembling the shaft to the constituent parts of a cam shaft, a mechanical forcing-in method, a method of hydraulically expanding a hollow shaft assembled with the parts, and so on have been so far conceived.

Cam pieces should be made of a specific abrasion-resistant material. In the case of the press-in method, if cam pieces are much harder than the shaft, the former, when forced in, will abrade the latter, rendering the method impracticable; and even if they can be forced in, the shaft diameter will change for every forcing, because a large number of them have to be forced in. In the case of the hydraulic expansion method, use of split molds is indispensable for setting the parts; and these parts, being made of a specific material characterized by abrasion-resistance and virtually zero elongation, are liable to be cracked by an increased internal pressure in time of expansion. Thus, either method has merits and demerits and its practical application is hardly realized.

SUMMARY OF THE INVENTION

The primary object of the present invention is to provide a process and device for assembling cam pieces, journal pieces, etc. to the cam shaft with ease and high productivity.

Another object of the present invention is to provide a process for easily assembling cam pieces, etc. to the cam shaft by simply moving the cam shaft in vertical direction.

Still another object of the present invention is to provide a telescopically mechanical method and a metallurgical method by brazing or metal diffusion of fitting cam pieces, etc. to the cam shaft.

BRIEF DESCRIPTION OF THE DRAWINGS

FIG. 1 is a plan view of a cam piece to be assembled.

FIG. 2(a) is an enlarged section view of the part A in FIG. 1, illustrating the profile of a projection, FIG. 2(b) being a section view of a V- or semicircular groove matching the projection (a) provided on the cam shaft.

FIG. 3 is a section view showing the forced-in state of a cam piece into the cam shaft.

DETAILED EXPLANATION OF THE INVENTION

Figure 4:
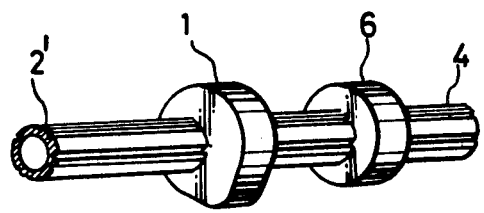
FIG. 4 is a partial oblique view of an assembled cam shaft.

The cam shaft manufacturing process according to the present invention is characterized in that as many V- or semicircular grooves (8 in, for instance, 4-cylinder engine) as the phases of cam are axially cut on the outside surface of the cam shaft, while V- or semicircular projections slightly larger than said V- or semicircular grooves are provided at one or two spots on the internal fitting surface of the parts such as cam pieces to be assembled to said cam shaft; and thus V- or semicircular projections of cam pieces are fitted to the matching V- or semicircular grooves of cam shaft.

Also it is characterized in that the mechanical method of fitting is coupled with a metallurgical method of brazing a brazing material pre-provided at the end of each cam piece by heating it to over its melting point, after the fitting, thereby filling a slight gap between the cam piece and the cam shaft; or of metal diffusion of the interface with the cam shaft through shrinkage when the cam piece is sintered at a specific heat in a specific atmosphere, after fitting a sintered product or a pre-sintered cam piece to the cam shaft.

Thus in the manufacturing process of an assembled cam shaft according to the present invention, one spot in the cam shaft groove is fitted to the cam piece projection; only at this spot the cam piece is forced into the cam shaft to be immobilized axially and circumferentially; and for the area other than said spot, metal diffusion assembly by brazing or sintering is done, thereby enhancing the bond strength between the cam shaft and the cam piece.

In the process according to the present invention, the grooves on the cam shaft are provided by mechanical processing with a shaper or by extrusion, while the projections on the cam piece, which defy the ordinary machining, can best be executed by sintering. For the purpose of brazing, the brazing materials such as copper filler, silver filler or solder are set as rings of necessary volume at the end of each fitted cam piece; and the brazing is done by heating them to over the melting point.

As for the journal pieces, they are limited in consumption and are simple in profile. Accordingly, even if the shaft is tapered through all-circumferential forcing, the grooves will not be rendered useless; but the process according to the present invention may be applied just as in the case of cam pieces, when they have to be made of a special material or an extraordinarily hard one.

The assembling device according to the present invention consists of a turntable equipped with as many dies as the pieces to be assembled in proper position and a vertically moving device for the cam shaft to be fitted.

Thus in this assembling device of the present invention, cam pieces and journal pieces are respectively set on the necessary number of dies provided on the turntable. Assembling is done by lowering the cam shaft held over these pieces, whereby said cam shaft piercing the pieces on the dies. Particularly the dies for cam pieces are so arranged that, when the cam shaft goes into the cam pieces, the direction of the cam nose may agree in phase. Adjustment of the assembling interval of pieces to the cam shaft can be done by a stopper provided for each die on the turntable, said stopper actuating the limit switch provided on the underside of the cylinder to control the downstroke of the cam shaft.

The movement of the turntable may also be governed by said limit switch. Thus with a rotation of said turntable cam pieces and journal pieces with different phases can be successively assembled to the shaft with efficiency.

Next the present invention is to be concretely explained by referring to the attached drawings. An embodiment of the process of assembling cam pieces to the cam shaft according to the present invention is illustrated in the following.

As shown in FIG. 1, a V-projection 2 or a semicircular projection 3 as denoted by (a) in FIG. 2 (enlarged section view of part A in FIG. 1) is provided axially at one or two spots on the internal surface of the cam piece 1. The formation of projections 2,3 may be executed by ordinary machining, but use of sintered alloy will be convenient for the purpose. The projection 2 is preferably 1 mm high with an open angle 90°, though it may be restricted by wall thickness when the cam shaft is made of steel. Meanwhile axially on the outside surface of the cam shaft is provided a V-groove 2' or a semicircular groove 3' as illustrated in FIG. 2(b), with a forced-in size appropriate for said cam piece projection; for instance, a V- groove 2' with a height 0.8 mm and an open angle 60° will be appropriate. When the cam piece is fitted to the cam shaft, only said groove and said projection are of the forced-in size and the appropriate bore of the cam piece relative to the diameter of the cam shaft, say, 28 mm will be 28.02–28.10 mm. An assembled state of the two in such a relationship is illustrated in FIG. 3.

Figure 5:
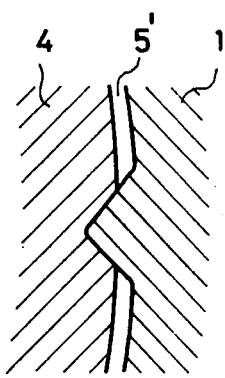
FIG. 5 is a section view showing a copper-brazed state of the gap in one embodiment of the present invention.
Figure 6:
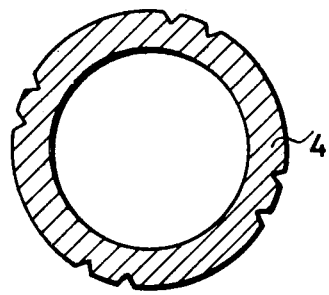
FIG. 6 is a section view of a cam shaft provided with as many grooves as the phases.

In FIG. 3, the cam shaft is denoted by 4, the cam piece by 1 and the gap by 5. In FIG. 4, which is an oblique view of the assembly, 4 is the cam shaft, 1 the cam piece, 6 the journal piece and 2' the groove. FIG. 5 illustrates another embodiment, in which the gap 5 is filled with a brazing material to enhance the bond strength; for this purpose, a copper filler is set at the end of a cam piece fitted to the cam shaft; and by holding the pieces for 30 minutes at 1120° C. in a protective atmosphere, the filler is melted and permeated, thereby being the state shown in FIG. 5.

Figure 7:
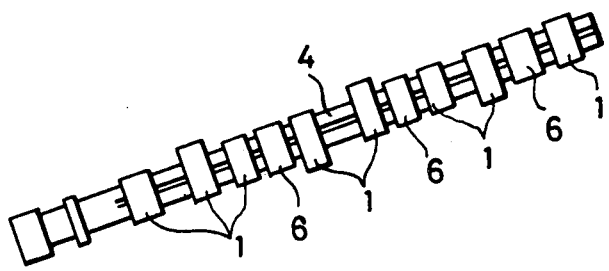
FIG. 7 is an oblique view of a finished state of the assembled cam shaft.

FIG. 7 illustrates an appearance of the assembled cam shaft thus completed.

The cam shaft in the above embodiment is made of ST KM13 with hardness $Hv \leq 200$; the cam pieces are made of a hard sintered alloy with $Hv \leq 600$, or they are made of a material which has a hardness of Hv 200 or so when forced in (assembled) and is hardened by heat treatment after assembled; and the journal pieces are made of a sintered alloy with $Hv \leq 200$, or of S45 or S41.

Next the assembling device to be used in the present invention is described.

Figure 8:
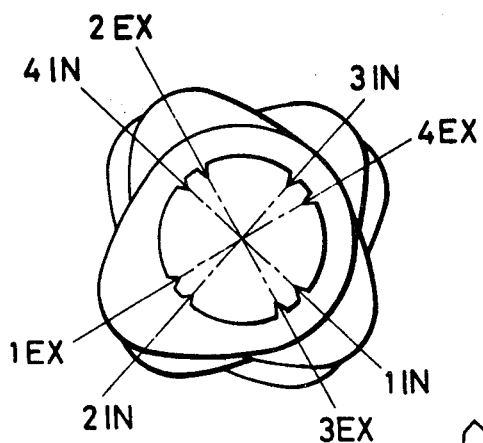
FIG. 8 is a top view showing the phase of a cam in one embodiment of the invention.
Figure 9:
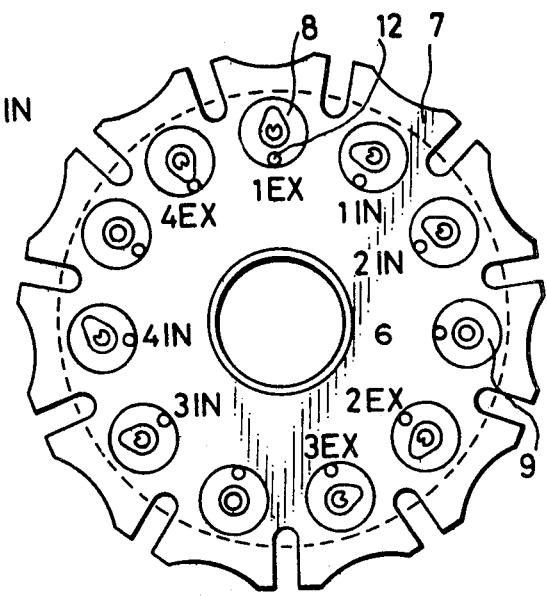
FIG. 9 is a plan view of a turntable in the assembling device.
Figure 10:
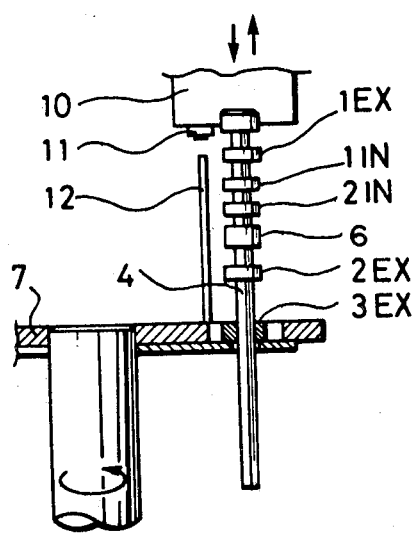
FIG. 10 is a schematic section view of the assembling device.

To fabricate a cam shaft shown in FIG. 7, the die 8 for cam pieces and the die 9 for journal pieces are arranged on a geneva gear turntable 7 as illustrated in FIG. 9, so that 11 pieces can be set thereon. It is necessary on account of the cam phase relationship shown in FIG. 8 to preset the direction of cam profile in each die 8 for cam pieces so that when a cam shaft is fitted into a cam piece, a specific phase is given at, say, the position 1Ex in FIG. 9. When a piece is delivered to each die, the cam shaft held by the support cylinder descends to fit into said piece. Suppose a cam piece corresponding to 3Ex in FIG. 10 is to be assembled. In that case, the cam shaft 4 descends through the cam piece; and when it reaches a specified position, the limit switch 11 located beneath the cam shaft support cylinder 10 comes to hit a stopper provided for each die on the turntable 7, thereby preventing the cam shaft from further descending and fixing the piece at that position. Subsequently the cam shaft assembled with the cam piece 3Ex ascends, whereby the turntable 7 makes a rotation equivalent to one die and the piece 6 to follow 3Ex is moved to a position just below said cam shaft. At the same time as the cessation of rotation, the cam shaft 4 again descends to make a similar assembling of the next piece. Depending on the length of the stopper 12 provided on each die, the pieces can be successively assembled with a specific interval.

Thus after every revolution of the turntable 7 in which assembly of the pieces is completed, the cylinder which supports the cam shaft opens and closes to hold a new shaft.

In this manner, in the process according to the present invention unlike in the conventional method of assembling the pieces to the cam shaft by all-circumferential forcing, as many grooves as the phases are provided on the cam shaft so that each groove is exclusively used to fit the projection of each cam piece. Accordingly the piece can be firmly fixed to the cam shaft; and, the forcing being confined to the fitted area, a low load suffices for the forced assembling, resulting in that the pieces are free from cracking due to the forcing and no tapering of the shaft due to many pieces being forced in occurs.

The cam shaft assembled according to the present invention is circumferentially fixed through cooperation between groove and projection and axially fixed on account of sufficient forcing; and by brazing the gap in the area other than the fixed portion, a phase or interval error of pieces in transportation or under brazing heat which is unavoidable in the conventional all-circumferential forcing can be fully eliminated.

In the assembling device according to the present invention, in which the pieces are held with the dies on the turntable and the phase is preset, the cam shaft with grooves supported on a cylinder has only to be moved in vertical direction; and the cam piece projection can remain unchanged; and thus the conventional troublesome split molds are needless.

Thus the present invention, the process according to which facilitates the manufacture of an assembled cam shaft which has been deemed difficult to realize and the assembling device according to which has a high productivity, should be considered to have an extremely high industrial value.

What is claimed is:

1. Camshaft assembling apparatus comprising, means for supporting a camshaft in a predetermined circumferentially oriented position for axial movement, a rotary table having a plurality of cam supporting stations, each moveable into axial alignment with said shaft, means at each cam supporting station for supporting a cam with its lobe in a predetermined angular position so that each cam is properly angularly oriented relative to the cam shaft upon movement of its station on the table into axial alignment with the shaft, and drive means for moving said cam shaft axially into said cam elements in succession to press the respective cam elements onto the shaft in a predetermined angular orientation with respect to the shaft and with respect to each other.

2. Apparatus according to claim 1 further comprising a plurality of journal supporting stations on said table, each moveable into axial alignment with said shaft.

3. Apparatus according to claim 1 further comprising means to limit the extent of axial movement of said drive means at each station, for positioning the respective cams at predetermined axial positions on said cam shaft.

4. Apparatus according to claim 3 wherein said means to limit the extent of axial movement of said drive means comprises, a stop at each station of the table, and a limit switch carried by said drive means for engagement with said stop.

* * * * *